United States Patent [19]

Smith et al.

[11] Patent Number: 5,306,204
[45] Date of Patent: Apr. 26, 1994

[54] STORAGE RACK AND LINKER FOR AN ELONGATED STRAND OF LINKED MEAT PRODUCTS

[75] Inventors: David W. Smith, West Des Moines, Iowa; Theo R. Bruinsma, Alphen a/d Rijn, Netherlands

[73] Assignee: Townsend Engineering Company, Des Moines, Iowa

[21] Appl. No.: 928,952

[22] Filed: Aug. 11, 1992

[51] Int. Cl.⁵ .................... A22C 11/00; A22C 15/00
[52] U.S. Cl. ........................ 452/186; 452/51
[58] Field of Search ................. 452/186, 51

[56] References Cited

U.S. PATENT DOCUMENTS

| | | | |
|---|---|---|---|
| 2,219,135 | 10/1940 | Maass | 452/186 |
| 2,308,740 | 1/1943 | Bogner | 452/51 |
| 3,233,281 | 2/1966 | Swift | 452/48 |
| 4,339,846 | 7/1982 | Zamiara | 452/51 |

FOREIGN PATENT DOCUMENTS 391805  3/1924  Fed. Rep. of Germany ...... 452/186

*Primary Examiner*—Willis Little
*Attorney, Agent, or Firm*—Zarley, McKee, Thomte, Voorhees & Sease

[57] ABSTRACT

A storage rack and linker for an elongated meat strand has a pair of spaced parallel plates with a plurality of elongated parallel bars extending there between. The parallel plates are comprised of two overlapping plate elements, one of which has a series of radially extending slots therein, which overlap some arcuate slots in the other of the plate elements.

Each of the bars is equipped with a cutting mechanism which is adapted to engage linked products draped around the parallel bars for severing the linked products from each other at an appropriate time during their creation. Each rack has a drive element on one end and a drive socket on the other so that racks can be nested with each other for rotational purposes, but can easily be removed from each other for storage or transporting purposes.

2 Claims, 2 Drawing Sheets

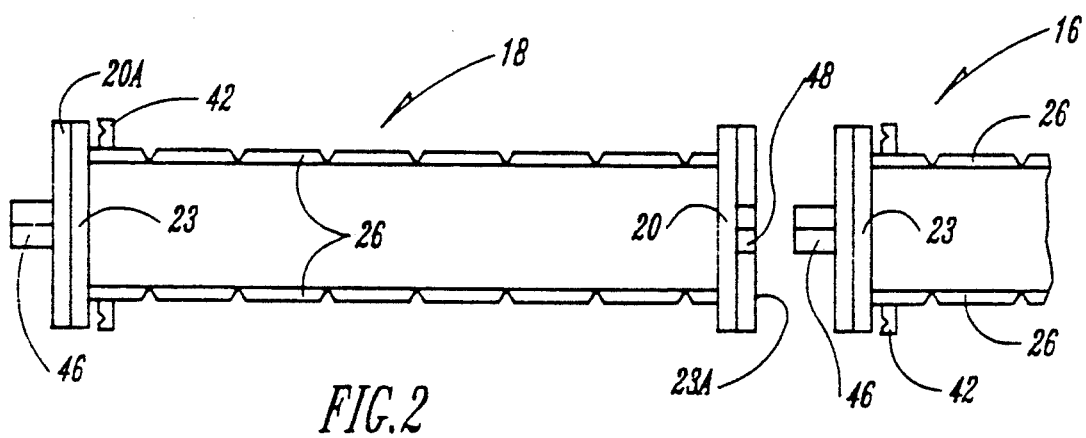
FIG.2
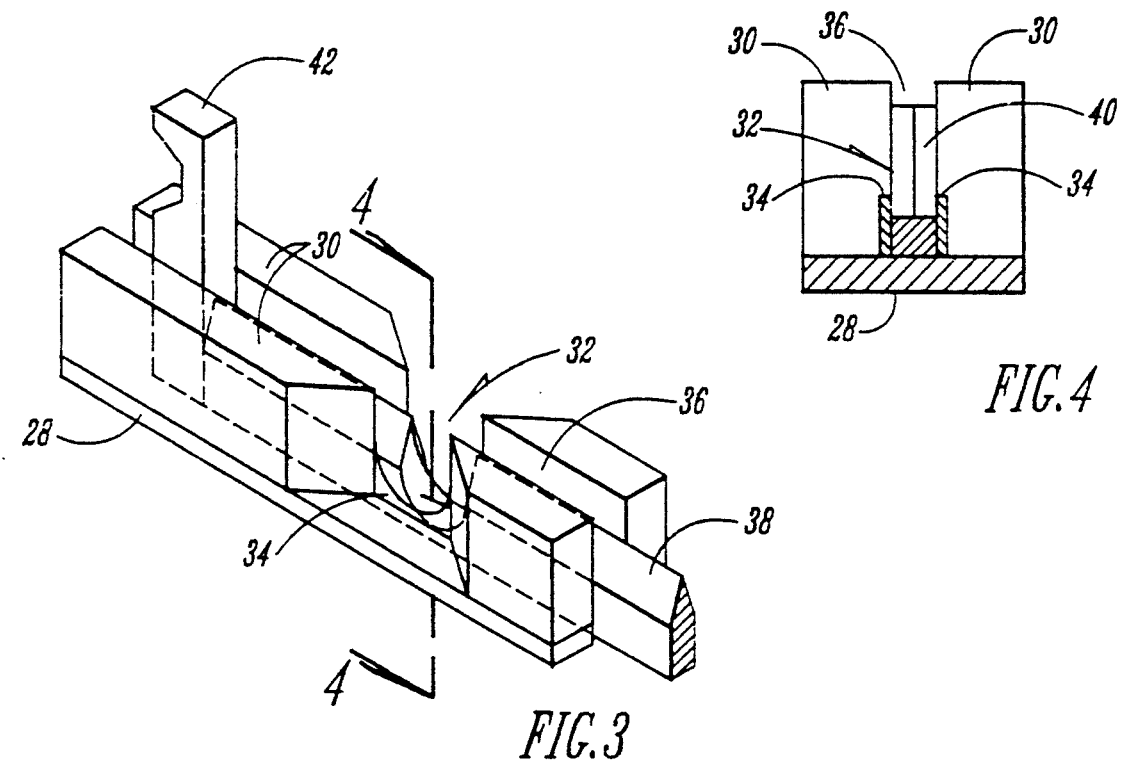
FIG.3
FIG.4
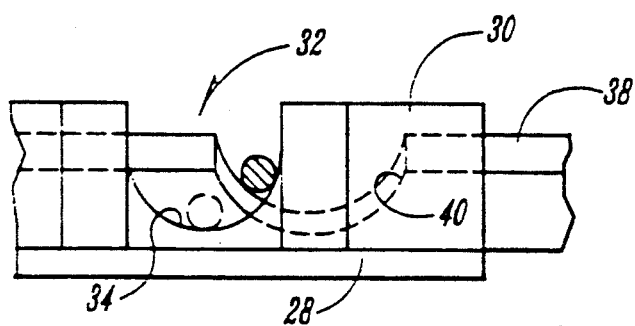
FIG.5

STORAGE RACK AND LINKER FOR AN ELONGATED STRAND OF LINKED MEAT PRODUCTS

BACKGROUND OF THE INVENTION

In recent times, it has become possible to extrude an elongated strand of meat emulsion and to simultaneously extrude a coating therefore comprised of a collagen material. While this process has certain advantages, one difficulty resulting therefrom is that the resulting coated strand cannot be easily rotated for linking, linked, or conveyed from one operating position to another. Conventional linking devices will not work with such a strand of meat product because this specific strand of meat product is not of sufficient strength and durability.

It is therefore a principle object of this invention to provide a storage rack and linker for an elongated strand of fragile meat products which will permit the linking and storage of the completed linked product.

A further object of this invention is to provide a storage rack which is adjustable in its effective diameter to accommodate linked products of different lengths.

A further object of this invention is to provide a storage rack which will permit the linked product mounted thereon to be quickly removed therefrom and quickly severed into a plurality of independent links.

These and other objects will be apparent to those skilled in the art.

SUMMARY OF THE INVENTION

The storage rack of this invention has a pair of spaced parallel plates with a plurality of elongated parallel bars extending there between. The parallel plates are comprised of two overlapping plate elements, one of which has a series of radially extending slots therein, which overlap some arcuate slots in the other of the plate elements. By rotating one plate with respect to the other, and by mounting the ends of the bars in the registering position of the two configurations of slots, the effective diameter of the rack defined by the space between the bars can be selectively adjusted.

Each of the bars is equipped with a cutting mechanism which is adapted to engage linked products draped around the parallel bars for severing the linked products from each other at an appropriate time during their creation.

Each rack has a drive element on one end and a drive socket on the other so that racks can be nested with each other for rotational purposes, but can easily be removed from each other for storage or transporting purposes.

BRIEF DESCRIPTION OF THE DRAWINGS

FIG. 2 is an exploded side elevational view showing the interconnection between two adjacent racks;

FIG. 3 is an enlarged scale perspective view of a portion of one of the bars of the rack and shows the cutting attachment therefore;

FIG. 4 is a sectional view taken on line 4—4 FIG. 3;

FIG. 5 is an enlarged scale side elevational view of the notched portion of the bar of FIG. 3; and FIG. 6 is an enlarged scale elevational view of the plate structure typically located on the ends of each rack.

DESCRIPTION OF THE PREFERRED EMBODIMENT

Figure 1:
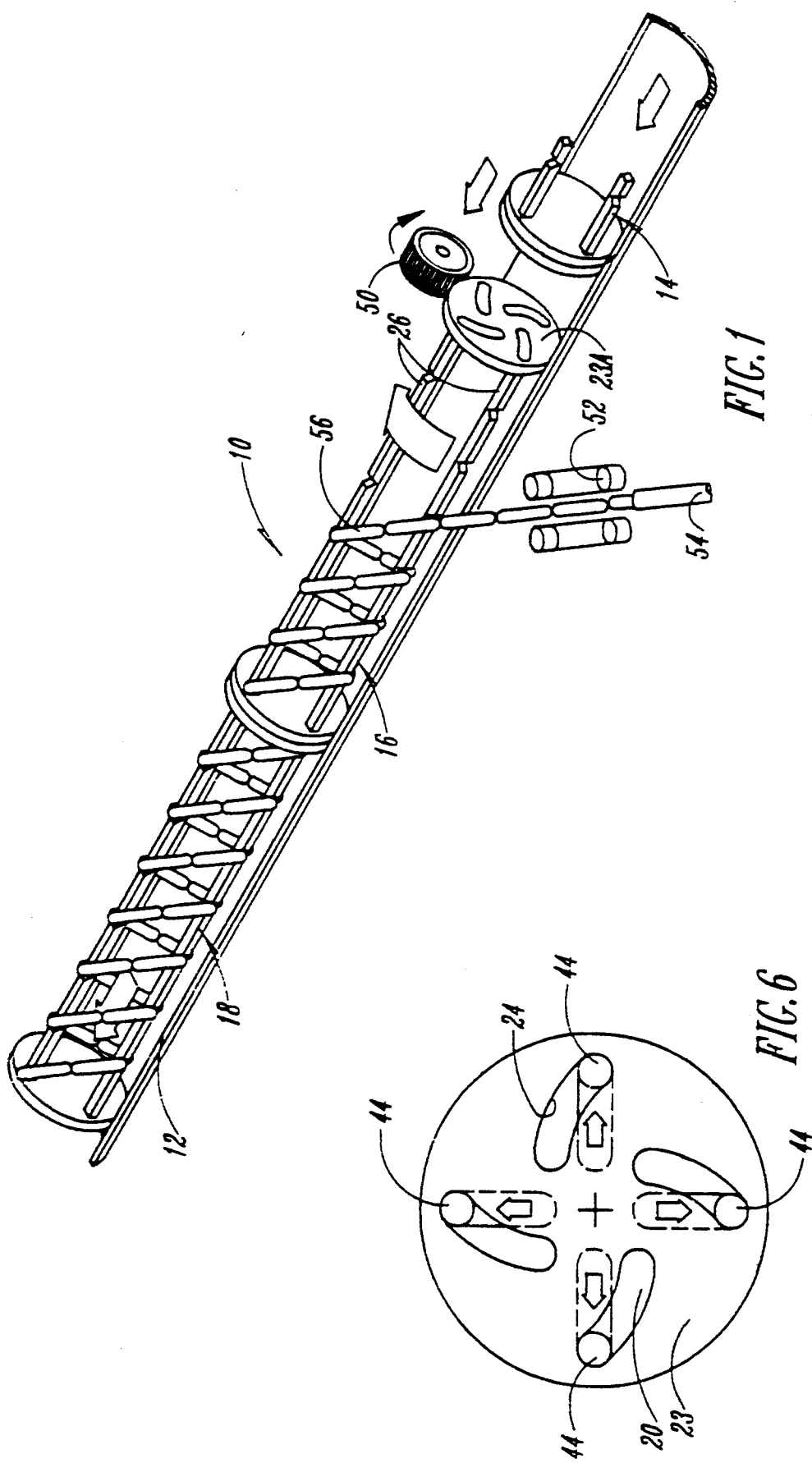
FIG. 1 is an exploded perspective view of the device of this invention.

The numeral 10 designates a rack assembly normally positioned in an arcuate trough support 12. Rack 14 is in an empty condition; rack 16 is being loaded with linked product; and rack 18 is completely loaded with linked product and is ready for removal for deposit in the conventional smoke or cooking room.

FIG. 6 illustrates plate 20 which appears at each end of each rack and includes a plurality of radial grooves 22. Overlapping plate 20 is plate 23 which has a plurality of arcuate grooves 24 which are adapted to register with the radial grooves 22 depending upon the relative rotational position of the two plates. (Variations in plates 20 and 23 will be described hereafter). With reference to FIG. 6, it is seen that when plate 23 is rotated in a clockwise direction with respect to plate 20, the stub shafts 44 on the ends of bars 26 will move towards the center of the plates, thus decreasing the effective diameter of the racks as defined by the distance between opposed bars 26.

Bars 26 are comprised of a bottom plate 28 with two side bars 30 (FIG. 3). Notches 32 are spaced along the length of each of the side bars 30, and each notch has a concave surface 34 in the bottom thereof (FIG. 5). The two side bars 30 are slightly spaced to create an elongated slot 36 in which cutting bar 38 is slidably mounted. Cutting bar 38 has a plurality of cutting notches 40 which are located at the same spacing as the notches 32 in the bars 26. A manual actuating lever 42 is secured to cutting bar 38, preferably adjacent one end of the bars 26. By sliding the cutting bar 38 in slot 36 (by manual pressure on the actuating lever 42 shown in FIG. 3), the cutting notches 40 in the cutting bar will intersect the notches 32 in the side bars 30 whereupon the link segment 58 to be discussed hereafter will be severed (see FIG. 5). This manual pressure can be applied by merely exerting longitudinal pressure on plates 20A and 23 (FIG. 2) whereupon plate 23 will engage each of the levers 42 on each of the bars 30 to cut and separate each link from each other.

As previously described, the cylindrical stub shafts 44 on the ends of bars 26 are adapted to be received within the registering grooves 22 and 24 of plates 20 and 23, respectively, so that the space in between the bars can be selectively adjusted. The shafts 44 have sufficient length to permit the plates to be moved longitudinally to effect the cutting action described above.

Drive element 46 appears on modified plate 20A (FIG. 2) and socket 48 compatible in size to drive element 46 appears on modified plate 23A (FIG. 2) so that the racks 14, 16 and 18 can be nested together in trough 12. A power roller 50 can be rotated on the periphery of plates 20 and 23 to cause all of the racks 14, 16 and 18 to rotate together.

A support means 52 is shown in FIG. 1 and is adapted to support horn 54 from which meat emulsion strand 56 is extruded. The strand 56 is played over diagonally disposed notches 32 in the bars of the various racks to create the helical configuration of the strand 56 shown on rack 16 and 18 of FIG. 1. It should be understood that the threading of the strand 56 over the notches 32 causes the individual links 57 to be formed. In between each link 57 is the link segment 58 which is shown in FIG. 5.

A conventional automatic fly cut mechanism (not shown) can be utilized to sever the strand 56 as soon as a rack is completely encircled as is the case with rack 18. When a rack, such as rack 18, is completely filled, it can be slidably moved away from the adjacent rack 16, and delivered to a conveying mechanism for deposit in a conventional smoke or cooking room. After the product is cooked, the cutting bars can be actuated in the manner previously described by manually moving the actuating levers 42, and each link on the rack will be severed from each other.

It is therefore seen that the device and method of this invention will achieve at least their stated objectives.

What is claimed is:

1. A storage rack for an elongated strand of linked meat products, comprising, a pair of spaced parallel plates, a plurality of elongated parallel bars extending between said plates, adjustment means on said plates to adjust the parallel positions of said parallel bars, said adjustment means comprises a pair of plates on each end of said rack, a first one of said plates having a plurality of radially extending slots therein, and the other of said plates having a plurality of arcuate slots registering with the radially extending slots in said first plate whereby when said bars are supported by their ends in the registering slots in said pair of plates, the radial distance between each of said bars being adjustable by rotating said plates with respect to each other, said bars having notches therein adapted to receive the narrow structure between links of an elongated linked strand of meat product, and a slidably knife structure in said bars with a cutting edge for each of said notches whereby the sliding movement of said knife structure through said notches will sever said link structures in said notches.

2. The storage rack of claim 1 wherein said bars are slidably connected to said plates, and mean on said knife structure engageable with said plates whereby longitudinal movement of at least one of said plates will actuate said knife structure to sever said link structures.

* * * * *